(12) United States Patent
Bastide et al.

(10) Patent No.: US 11,211,050 B2
(45) Date of Patent: Dec. 28, 2021

(54) STRUCTURED CONVERSATION ENHANCEMENT

(71) Applicant: International Business Machines Corporation, Armonk, NY (US)

(72) Inventors: Paul R. Bastide, Boxford, MA (US); Fang Lu, Billerica, MA (US); Robert E. Loredo, North Miami Beach, FL (US); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/539,975

(22) Filed: Aug. 13, 2019

(65) Prior Publication Data

US 2021/0050002 A1 Feb. 18, 2021

(51) Int. Cl.
*G10L 15/32* (2013.01)
*G10L 15/06* (2013.01)
*G10L 15/183* (2013.01)
*G10L 15/16* (2006.01)

(52) U.S. Cl.
CPC ............ *G10L 15/063* (2013.01); *G10L 15/16* (2013.01); *G10L 15/183* (2013.01); *G10L 15/32* (2013.01); *G10L 2015/0631* (2013.01); *G10L 2015/0638* (2013.01)

(58) Field of Classification Search
CPC .................. G06F 40/00–58; G06F 16/3344
USPC .................... 704/1, 9, 10, 257, 270–275
See application file for complete search history.

(56) References Cited

U.S. PATENT DOCUMENTS

| 8,477,920 | B2 | 7/2013 | Mikan et al. |
| 8,743,171 | B2 | 6/2014 | Hiller et al. |
| 8,804,577 | B1* | 8/2014 | Kondapalli ............... H04N 7/15 370/261 |
| 9,372,543 | B2 | 6/2016 | Lo et al. |
| 2008/0212760 | A1* | 9/2008 | Beshears ............. H04M 3/5158 379/210.01 |
| 2009/0313075 | A1 | 12/2009 | O'Sullivan et al. |

(Continued)

FOREIGN PATENT DOCUMENTS

WO WO-9953691 A2 * 10/1999 ............... H04N 7/15

OTHER PUBLICATIONS

"Gnip APIs," [online] Twitter, Inc. © 2019 [retrieved Aug. 13, 2019], retrieved from the Internet: <https://support.gnip.com/apis/>, 2 pg.

(Continued)

*Primary Examiner* — Jesse S Pullias
(74) *Attorney, Agent, or Firm* — Cuenot, Forsythe & Kim, LLC (57) ABSTRACT

Structured conversation enhancement can include determining an anticipated ebb point of a current conversation. The determination can be made in response to a predetermined triggering event indicating a start of the current conversation. Structured conversation enhancement also can include monitoring the current conversation using pattern recognition. A probable change in the anticipated ebb point can be determined in response to recognizing a predetermined word pattern indicating a change in the conversation. A response action can be initiated in response to the probable change in the anticipated ebb point.

20 Claims, 6 Drawing Sheets

(56) References Cited

U.S. PATENT DOCUMENTS

| | | | | |
|---|---|---|---|---|
| 2009/0327169 | A1* | 12/2009 | Kamar | G06Q 10/109 |
| | | | | 706/11 |
| 2013/0117060 | A1 | 5/2013 | Henriksen et al. | |
| 2014/0237371 | A1 | 8/2014 | Klemm et al. | |
| 2014/0379404 | A1 | 12/2014 | Bastide et al. | |
| 2015/0256675 | A1* | 9/2015 | Sri | H04L 12/1827 |
| | | | | 379/265.09 |
| 2015/0304492 | A1* | 10/2015 | Eyeson | H04M 3/5175 |
| | | | | 379/265.1 |
| 2016/0316059 | A1* | 10/2016 | Nuta | G06Q 10/04 |
| 2017/0214799 | A1* | 7/2017 | Perez | H04M 3/5235 |
| 2018/0137472 | A1 | 5/2018 | Gorzela et al. | |
| 2019/0236551 | A1* | 8/2019 | Shah | G06Q 10/063116 |
| 2019/0347621 | A1* | 11/2019 | White | G06N 7/005 |

OTHER PUBLICATIONS

"Social Media Archiving | Capture Social Media Content | Smarsh," [online] Smarsh Inc. © 2019 [retrieved Aug. 13, 2019], retrieved from the Internet: < https://www.smarsh.com/connectors/social/>, 10 pg.

"Watson Natural Language Classifier," [online] Watson, IBM Corporation [retrieved Aug. 13, 2019], retrieved from the Internet: <https://www.ibm.com/watson/services/natural-language-classifier/>, 10 pg.

Mell, P. et al., The NIST Definition of Cloud Computing, National Institute of Standards and Technology, U.S. Dept. of Commerce, Special Publication 800-145, Sep. 2011, 7 pg.

\* cited by examiner

STRUCTURED CONVERSATION ENHANCEMENT

BACKGROUND

This disclosure relates to communication systems, and more particularly, to managing multi-participant conversations over a communication system.

Various communication and collaboration platforms enable multiple individuals to interact with one another for a variety of purposes. Such platforms can provide, for example, enterprise-wide instant messaging, web conferencing, community collaboration, telephony integration, text messaging, cognitive computing capabilities, and various other services. Individuals can use such platforms to engage in conversations, whether verbal or written, in real time.

SUMMARY

In one or more embodiments, a method includes determining, with computer hardware, an anticipated ebb point of a current conversation in response to a predetermined triggering event indicating a start of the current conversation. The method can include monitoring, with the computer hardware, the current conversation using pattern recognition and determining a probable change in the anticipated ebb point in response to recognizing a word pattern indicating a change in the current conversation. The method also can include responding to the probable change in the anticipated ebb point by initiating, with the computer hardware, a response action.

In one or more embodiments, a system includes a processor configured to initiate operations. The operations can include determining an anticipated ebb point of a current conversation in response to a predetermined triggering event indicating a start of the current conversation. The operations also can include monitoring the current conversation using pattern recognition and determining a probable change in the anticipated ebb point in response to recognizing a word pattern indicating a change in the current conversation. The operations also can include responding to the probable change in the anticipated ebb point by initiating a response action.

In one or more embodiments, a computer program product includes a computer readable storage medium having program instructions stored thereon. The program instructions are executable by a processor to initiate operations. The operations include determining, by the processor, an anticipated ebb point of a current conversation in response to a predetermined triggering event indicating a start of the current conversation. The operations can include monitoring, by the processor, the current conversation using pattern recognition and determining a probable change in the anticipated ebb point in response to recognizing a word pattern indicating a change in the current conversation. The operations also can include responding to the probable change in the anticipated ebb point by initiating, by the processor, a response action.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to communication systems, and more particularly, to managing multi-participant conversations over a communication system. Multi-participant conversations over a communication system often occur in a specific context such as a business meeting, training session, scrum, or similar such context. Many such conversations can be characterized as structured conversations in that the conversations follow, whether by explicit design or informal custom, some type of format or construct. A format, for example, can comprise an introductory phase, discussion of one or more specific topics (perhaps including a question-and-answer phase), and a closing phase. A structured conversation often does not proceed according to an explicitly stated or implied format made known to participants before the start of the conversation.

In accordance with the inventive arrangements disclosed herein, a structured conversation can be enhanced by monitoring the ebb and flow of the conversation and responding to shifts in the conversation. The methods, systems, and computer program products disclosed herein can determine an anticipated ebb point at the start of conversation and revise the anticipated ebb point in response to monitored ebbs and flows of the conversation. Monitoring of the ebbs and flows of the conversation can lead to revisions of the anticipated ebb point, thereby alerting the conversation participants of the likelihood that the conversation will conclude later or earlier than previously expected. The methods, systems, and computer program products disclosed herein can respond to the ebb and flow of a conversation by initiating a response action, including establishing an alternate platform on which some conversation participants can continue a conversation that is expected to run longer than originally anticipated.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
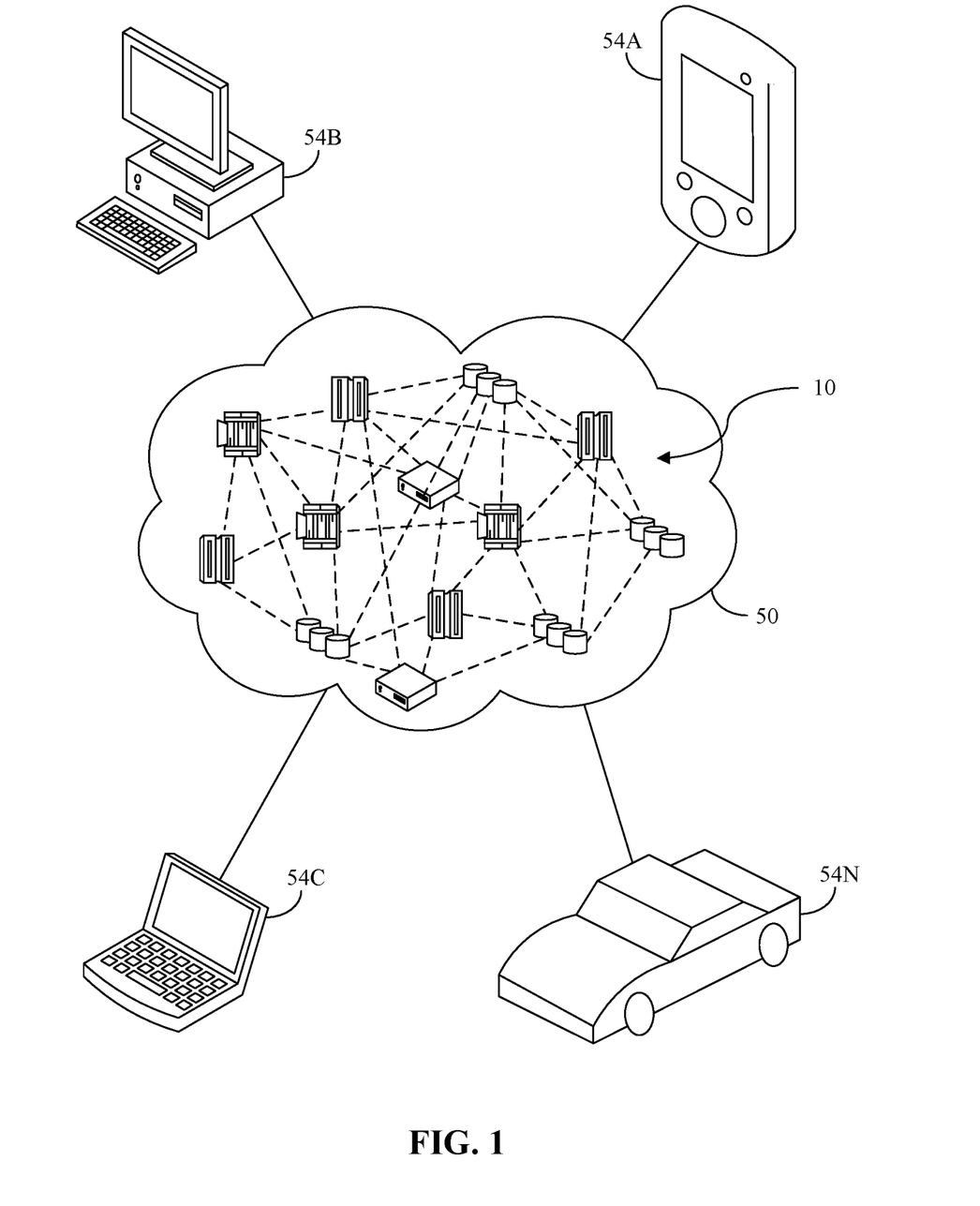
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
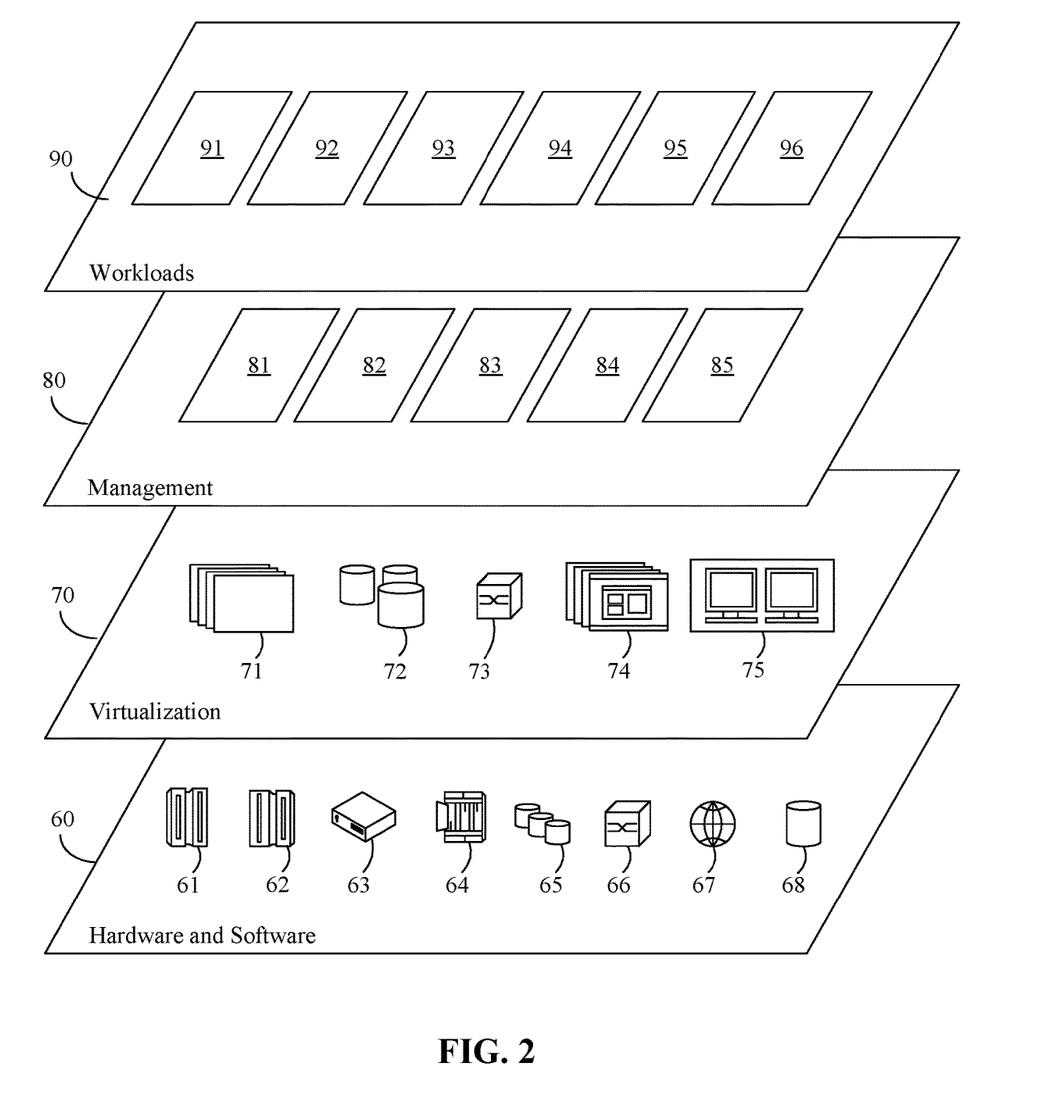
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and structured conversation enhancement 96.

In one or more embodiments, system for structured conversation enhancement 96 is capable of identifying ebbs and flows within a conversation. A "conversation," as defined herein, is a verbal interaction or written exchange of words between two or more participants. The system can identify phrases in a textual rendering (the "text") of a conversation. As defined herein, a "phrase" is a word or intelligible sequence of words, whether in the form of grammatical clause, sentence or series of sentences. According to one embodiment, the system is trained using machine learning to recognize topics of conversations and to classify phrases within the conversations according to specific topics. As defined herein, a "topic" is a subject of, or a matter dealt with in, a conversation. Based on phrases identified in a conversation text (including textual renderings of verbal conversations), the system can determine the ebb and flow of a conversation from which the phrases are drawn. As defined herein, the "ebb and flow" of a conversation are changes, or shifts, that occur within the conversation as the conversation progresses. A conversational change or shift includes, for example, moving from one phase of a conversation to another and/or switching topics. An example of a conversational change or shift includes moving from an introduction to a topic-specific discussion. A conversational change or shift includes, for example, moving from one topic to another topic. A conversational change or shift, for example, is moving from a topic-specific discussion to a question-and-answer phase in which one or more questions are posed, regardless of whether there is a response, equivocation, or no response to a question. Still another example includes the moving from a question-and-answer phase or topic-specific discussion to a concluding phase.

An introduction can be a general introduction (e.g., naming and/or welcoming participants) or topic-specific introduction (e.g., describing a topic and/or defining topical terms). A topic-specific discussion includes a series of statements, at least some of which relate to a set of one or more common concepts. Accordingly, some words or phrases may be unrelated or extraneous to the topic, but over a definable time period words or phrases of the conversation relate to one another by pertaining to a topic notwithstanding possible intervening words or phrases. Extraneous words or phrases can comprise brief phases of what is generally referred to as "getting off topic," but nevertheless the conversation returns to the words or phrases that pertain to the topic before a conclusion of the discussion. A concluding phase, for example, can include a summation of the discussion, a proposal or a directive for future discussion, and/or a brief salutation. System for structured conversation enhancement 96 can be trained using machine learning to identify and classify word patterns corresponding to specific phrases indicating various conversation shifts.

System for structured conversation enhancement 96 is capable of responding to conversation shifts. For example, based on statistical analysis of prior conversations, the system can determine an anticipated ebb point. As defined here, "ebb point" is the point in which a conversation concludes. The ebb point can correspond to that point in a conversation at which substantive conversation ceases and closing comments (e.g., salutation, setting up of a follow-on meeting) are made, comments that, as sometime said, "wrap up" or conclude the conversation. The "anticipated ebb point," as defined herein, is the expected time at which the ebb point occurs. Accordingly, the anticipated ebb point corresponds to a probability that a conversation will conclude within a specified time, independent of any pre-scheduling of the conversation's end time. The system is capable of monitoring the ebb and flow of the conversation and revising the anticipated ebb point in response to recognized word patterns indicating that the conversation will end earlier or later than previously predicted. The system is capable of initiating one or more actions in response to changes or shifts in the conversation, including establishing an alternative platform to continue a conversation if only some of a group of participants want to continue beyond an anticipated end time (other participants are free to wrap up on the conversation's current platform). Further features of system for structured conversation enhancement 96 are described below in greater detail.

Figure 3:
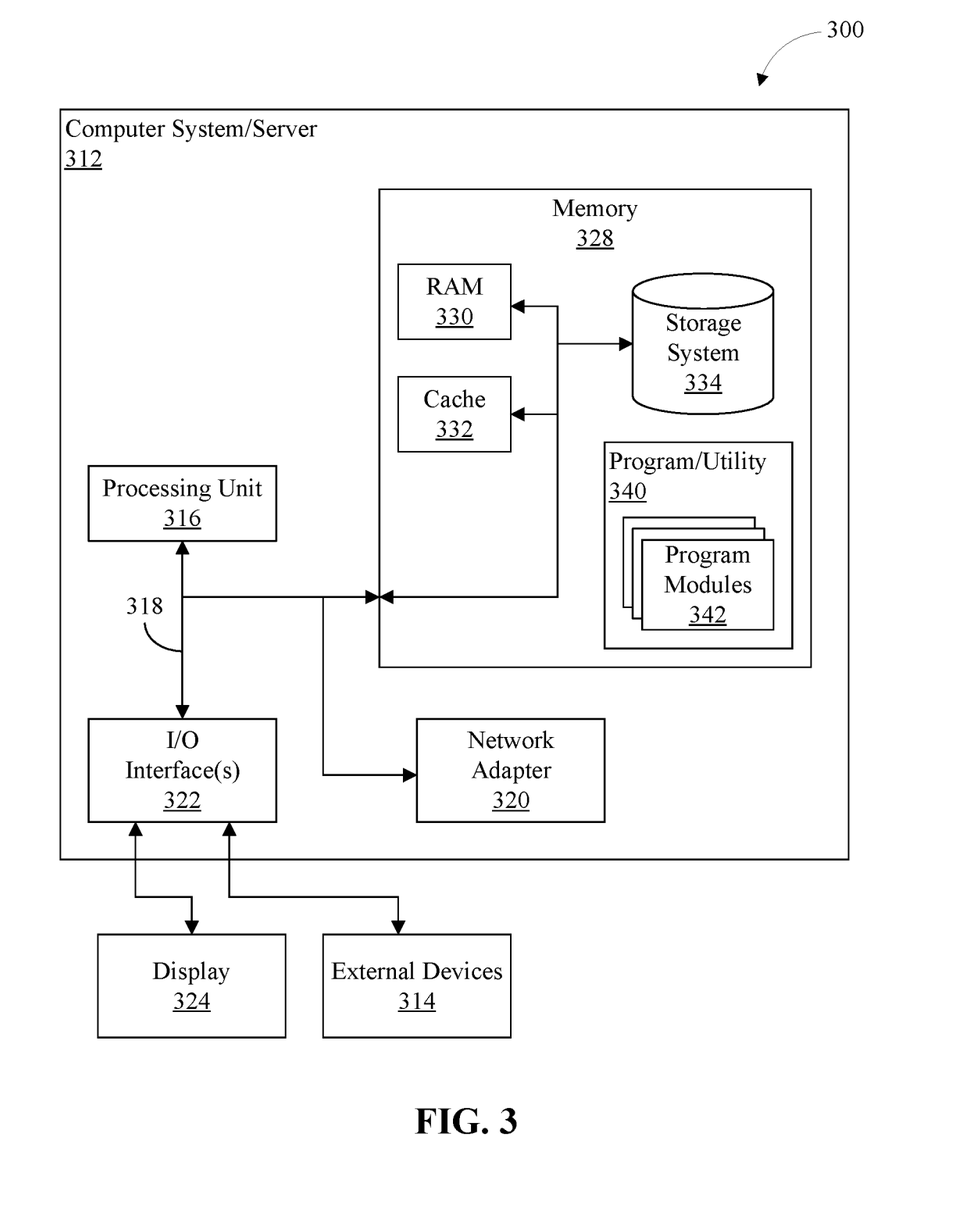
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system for structured conversation enhancement 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to the following: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
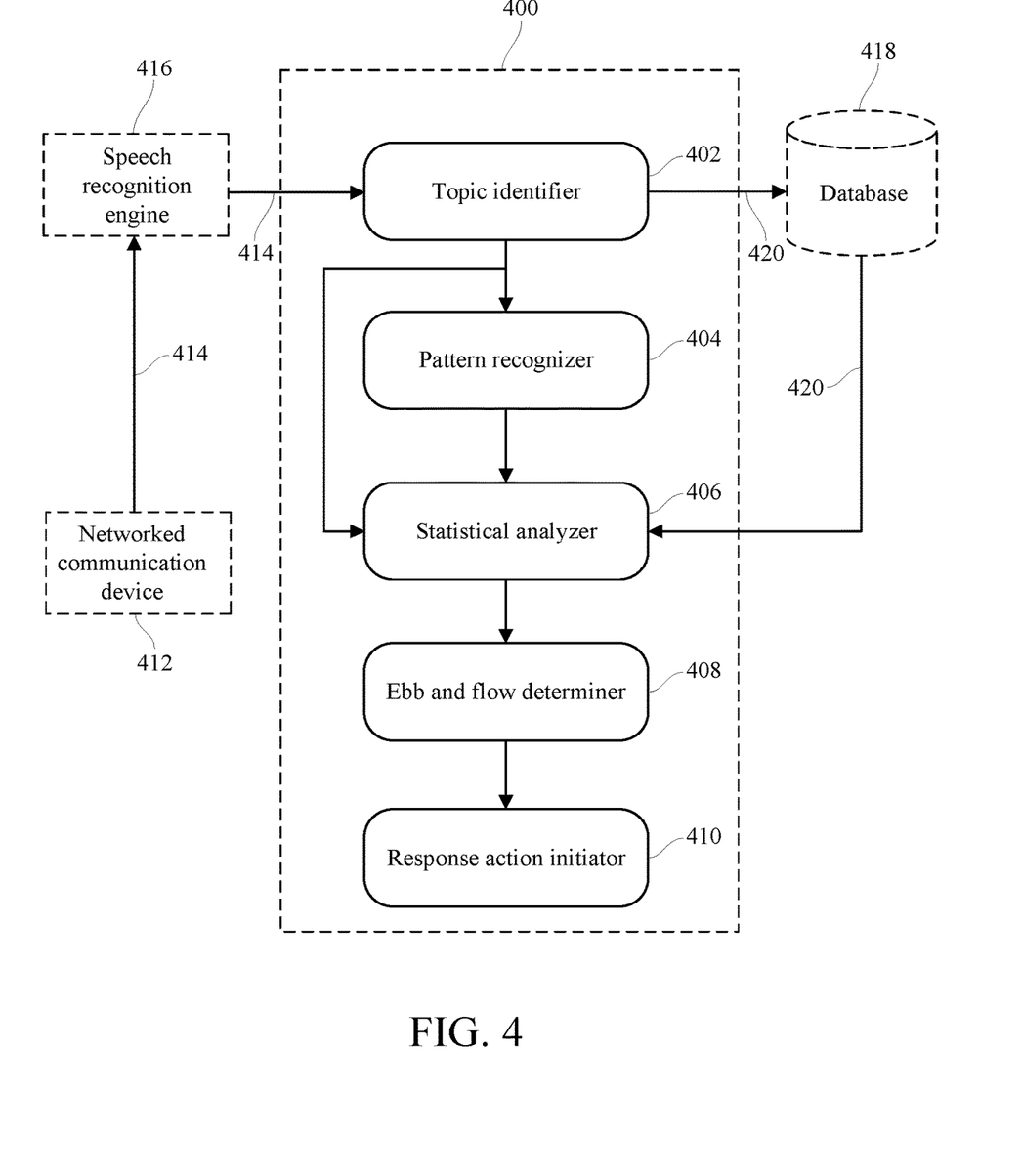
FIG. 4 depicts a system of structured conversation enhancement according to an embodiment of the present invention.

FIG. 4 depicts system 400, which according to one embodiment, is similar to system for structured conversation enhancement 96 described in reference to FIG. 2. System 400 illustratively includes topic identifier 402, pattern recognizer 404, statistical analyzer 406, ebb and flow determiner 408, and response action initiator 410. In one embodiment, system 400 is implemented in computer system-executable instructions (e.g., one or more program modules) that are executable by a processor such as processor 316 of computer system 312 described in reference to FIG. 3. Accordingly, system 400 can be implemented, for example, in computer-system instructions executable on a server (e.g., cloud-based server) or other type of computer system. In other embodiments, one or more of topic identifier 402, pattern recognizer 404, statistical analyzer 406, ebb and flow determiner 408, and response action initiator 410 can be implemented in hardwired circuitry or in a combination of circuitry and computer system-executable instructions.

System 400 can be integrated in a communication system, collaboration system, social network, or other networked system. System 400 can be communicatively coupled with more than one such system simultaneously.

Operatively, system 400 determines the ebb and flow of a conversation among multiple participants in real time. The participants can conduct the conversation using communication devices (only one of which, communication device 412, is explicitly shown) communicatively coupled via communications network 414. The conversation can occur through a series of written and/or verbal exchanges. System 400 operates on text and, accordingly, speech recognition engine 416 can be interposed between the system and networked communication devices. Communications network 414 can be implemented in, or include, one or any combination of communication technologies such as a local area network (LAN), wide area network (WAN), wireless network (e.g., wireless WAN and/or wireless LAN), mobile or cellular network, virtual private network (VPN), public switched telephone network (PSTN), or the Internet. Networked communication devices can communicatively couple to communications network 414 via wired and/or wireless communication links and can comprise computer systems (e.g., servers, personal computers, portable computers, tablets), mobile devices such as smart phones, telephones such as voice-over IP (VoIP) phones, or other types of communication device. Such devices can be used to establish audio, video, audiovisual, or other types of communication sessions through communications network 414. Non-written communications are converted to text by speech recognition engine 416, as noted above.

With respect to a current conversation, system 400 initially determines at the start of the conversation an anticipated ebb point of the current conversation. The anticipated ebb point can correspond to a probability that the current conversation will conclude within a system-determined time. The anticipated ebb point is determined independently of any scheduled conclusion for the current conversation, and indeed, is determined regardless of whether conversation participants have scheduled a conclusion or merely left open the time for concluding the conversation. The initial determination of the anticipated ebb point is based on a statistical analysis of prior conversations pertaining to one or more topics that coincide with the topic or topics of the current conversation. Statistically, the anticipated ebb point is an expected value in that the anticipated ebb point is a point corresponding to a time which system 400 determines the conversation is most likely to conclude. As the conversation proceeds, however, the anticipated ebb point can change.

As the conversation progresses, system 400 analyzes a corresponding text (converted from speech as necessary) on an on-going basis and changes the anticipated ebb point according to the ebb and flow of the current conversation. Depending on the ebb and flow of the current conversation, the anticipated ebb point may be extended, indicating that due to the observed ebb and flow the current conversation is likely to conclude later than initially anticipated. In other instances, however, the anticipated ebb point may be advanced, indicating that based on the observed ebb and flow the conversation is likely to conclude earlier than previously anticipated. Any prior scheduling of the conclusion that may have been made is irrelevant to the determination of the likely conclusion time. The anticipated ebb point is not based on any predetermined scheduling, but rather is based solely on the ebb and flow of the current conversation.

In response to a change in the anticipated ebb point, system 400 can initiate one or more response actions. One such response action can be to notify one or more of the participants of a change in the anticipated ebb point. Accordingly, the notification can indicate that the current conversation is now likely to conclude later than previously anticipated or, conversely, that the conversation is likely to conclude earlier than previously anticipated. System 400 can provide a probabilistically determined indication of how much sooner or later the conversation is likely to conclude. Multiple notifications can be issued as the anticipated ebb point changes with the ebb and flow of current conversation as the current conversation progresses. Another action initiated by system 400 can be a suggestion to speed up the conversation by taking a predetermined action (e.g., avoid questions and answers, limit discussion of one or more topics). Yet another possible action is a suggestion to change the topic of conversation. Still another action initiated by system 400 can be to move the current conversation to an alternate forum or communication platform, as described in greater detail below.

Figure 5:
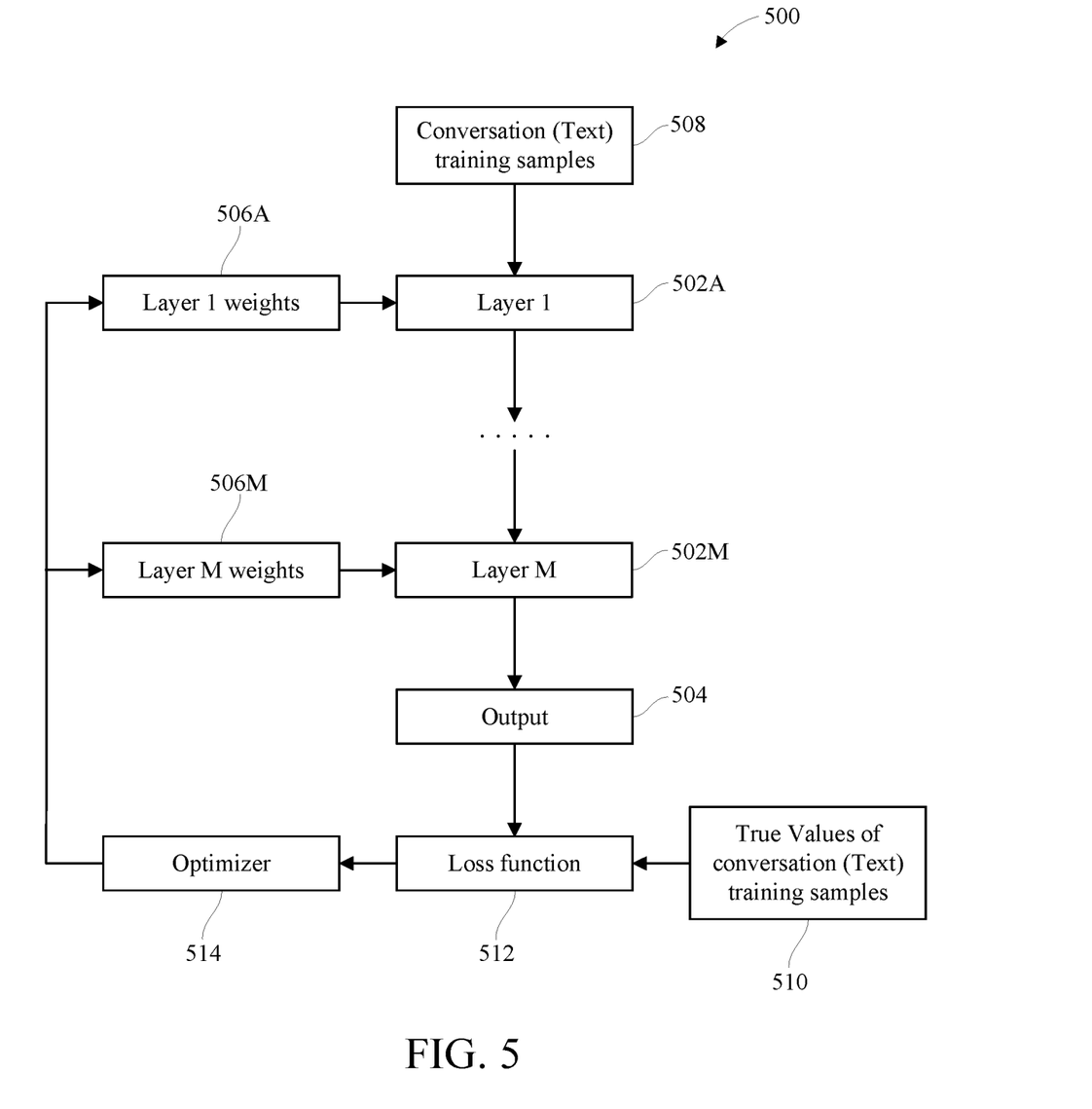
FIG. 5 depicts a deep learning neural network used in a system of structured conversation enhancement according to an embodiment of the present invention.

Current conversation topics are determined by topic identifier 402. Topic identifier 402 can be implemented with machine learning. In one embodiment, topic determiner 402 comprises a deep learning neural network that learns to classify conversation text (including textual renderings of verbal conversations) into one of N categories, each category corresponding to a predetermined topic. Text generated from prior conversations and archived in database 418 and can be used to train the neural network. Referring additionally to FIG. 5, neural network 500 for determining current conversation topics is illustratively a deep learning neural network that comprises a directed, acyclic graph of layers (text processing modules or filters) 502A through 502M that are sequentially chained together. Output 504 generated by neural network 500 is based on input that feeds through layers 502A through 502M, each layer modifying the output of a preceding layer based on a set of parameters or weights 506A through 506M. The weights (kernel and bias attributes) are trained (iteratively refined) using training samples of conversations (text) 508 fed into the neural network. The output generated is compared with true values 510 of the training samples of conversations (text) 508. The difference between the generated values and true values 510 for classifying the training samples of conversations (text) 508 is measured by a loss calculated by loss function 512. In one embodiment, loss function 512 is the categorical cross-entropy criterion. In a feedback fashion, optimizer 514 adjusts weights 506A through 506M over successive iterations using the backpropagation algorithm. The backpropagation algorithm iteratively adjusts weights 506A through 506M in directions that lower the loss calculated by loss function 512. The iterative refinement of weights 506A through 506M continues until an acceptable level of accuracy is achieved in classifying a separate test set of samples of text of conversations.

Input to neural network 500 is initially in the form of text (including textual renderings of verbal conversations) and is therefore transformed into numerical tensors (multidimensional algebraic objects analogous to one-dimensional vectors) by breaking the text (e.g., words, characters, n-grams) into tokens and associating numeric vectors with each. Any technique such as categorical encoding (one-hot encoding) or word embedding can be used to transform text into numerical tensors. For each text so transformed, neural network 500 outputs an N-tuple, each of whose elements is a probability (between zero and one) that the conversation embodied in the text belongs to the corresponding one of the N categories. The conversation (text) is classified as belonging to the topic category for which the probability is greatest. Responsive to classifying newly presented text corresponding to a current conversation, neural network 500 determines the current topic of conversation. As a conversation proceeds, new text is generated and neural network 500 can determine from the generated text whether a new topic is introduced into the current conversation.

Referring still to FIG. 4, statistical analyzer 406 determines an expected time (the most likely time) that a conversation will last given the specific topic or topics of the conversation determined by topic identifier 402. The determination is made based on prior conversations archived in database 418, which illustratively is coupled communicatively to system 400 via communication link 420. Statistical analyzer 406 analyzes archived conversations selected based on the topic classification of the conversations using any of various statistical methodologies. For example, assuming that conversation times exhibit a Gaussian or normal distribution, statistical analyzer 406 can determine a mean and standard deviation of the prior conversations pertaining to a given topic and based on the determined mean can provide the expected time, at a specific confidence level, that the conversation on the given topic will last.

Archived text can be stored in database 418 along with other data. The data can optionally include other conversation-specific data that can be used to refine time predictions. Conversation-specific data can include, for example, identities of participants in a prior conversation. Predicted times pertaining to a given topic of a current conversation can vary, based on analysis of prior conversations, depending on who the participants are. Conversation-specific data also can include, for example, sentiment determined by a sentiment or tone analyzer (not shown, but optionally part of system 400). The sentiment or tone analyzer can use linguistic analysis to detect sentiments such as joy, fear, sadness, anger, analytical, confident and tentative tones expressed in conversation text (or textual rendering of verbal communication). Predicted times pertaining to a given topic of the current conversation can vary depending on a particular sentiment of one or more of the participants. Metadata also can be stored in database 418 for determining a level of importance or urgency of the current conversation. Metadata can be used to refine system-based topic identification if there is residual uncertainty regarding a conversation topic. For example, in a conversation that references "widget," metadata can provide additional context to the reference, such that the context for "widget" is specific to conversation participants Alice and Bob rather than to participants Alice and Charles or participants Bob and Charles. Other conversation-specific data can be multipurpose Internet mail extension (MIME) data, such as tags and/or labels. Other conversation-specific data can include social media data pulled from a social media communication service. The data can be used to further identify specific topics of conversation.

Various schema can be used for indexing the data stored in database 418. Conversations (embodied in textual renderings), for example, can be archived based on assigned conversation identifiers ("IDs"). Conversations, in one embodiment, can be ordered in conversation timeseries comprising conversations that have the same unique conversation ID (or other "fingerprint") based, for example, on a check sum (e.g., SHA1/MD5). Thus, conversations that include both verbal and text-based communications, can be arranged in the proper sequence to generate a complete textual rendering of the conversation. Conversations embodied in written messages (e.g., text messages, email) can ignore reply-to or forwarded content so that content of the conversation is more clearly discernable. In one embodiment, a system user can pre-select among the available types of data stored in database 418 the specific data types used by statistical analyzer 406 for determining an expected time that a conversation on a specific topic will last.

As a conversation proceeds, the ebb and flow of the conversation can change the likely time that the conversation concludes. The ebb and flow tracks conversational changes or shifts in conversation such as moving the conversation from an introduction to a topic-specific discussion, moving the conversation from one topic to another topic, beginning a question-and-answer phase, and moving the conversation from a question-and-answer phase or topic-specific discussion to a concluding phase. These shifts are recognized by pattern recognizer 404, which identifies conversational changes by recognizing word patterns. Some word patterns can be specific to one or more particular topics. Other word patterns (e.g., introductions, salutations, invitations for questions and answers during a discussion) apply more generally to multiple topics or to all conversations regardless of topic.

System 400 optionally incorporates a natural language processor (NLP) with the capability to identify word patterns that differ only in grammatical structure or style, but whose substantive content expresses the same or closely similar thoughts or sentiments. In one embodiment, the NLP analyzes the content of current and archived conversations (text) using a lemmatizer, a natural language processing technique that performs morphological analysis to identify the lemmas of distinct words in a conversation text. A lemma is the base or dictionary form of a word. For example, implementing a lemmatization, the NLP treats a word such as "saw" as either "see" or "saw" depending on whether the word is used in the document as a verb or a noun, which can be determined by the NLP using parts-of-speech tagging.

In another embodiment, the NLP uses a stemming procedure to reduce inflectional forms and derivationally related forms of words in the text of current and archived conversations. Stemming typically requires less information than lemmatizing (which relies on a vocabulary and morphological analysis to lemmatize words), but is a less refined, more heuristic process that identifies the roots of words by eliminating word endings or derivational affixes of the words. The NLP, in various embodiments, can implement different stemming algorithms, such as the Porter stemmer (which consists of five, sequentially applied phases of word reductions), Lovin stemmer, or Paice stemmer.

The capability to identify word patterns that differ only in grammatical structure or by virtue of stylistic differences enables pattern recognizer 404 to treat conversation phrases that convey the same thought or sentiment as equivalent in identifying word patterns. In one embodiment, pattern recognizer 404 is implemented using machine learning, such as the deep learning neural network described above. Pattern recognizer 404 can use deep learning to learn word vector representations through natural language models. Word vectors, wherein words are projected from a sparse 1-of-V encoding (V being the size of a predetermined vocabulary) onto a lower dimensional vector space via a hidden layer, are essentially feature extractors that encode semantic features of words. The dense representation of words that are close, either in a Euclidean or cosine distance sense, are thus semantically close or similar in the lower dimensional vector space. Pattern recognizer 404 can implement a convolutional neural network (CNN) comprising layers with convolving filters for identifying word patterns based on the dense representation of words. Pattern recognizer 404 using a CNN can be trained to recognize word patterns that correspond to specific changes or shifts in a current conversation.

In another embodiment, pattern recognizer 404 can use a clustering technique or algorithm (e.g., k-means clustering) for recognizing word patterns (e.g., phrases, sentences) corresponding to changes or shifts in a current conversation. Conversation text, representing distinct objects, can be grouped into clusters or groups such that sufficiently similar patterns are partitioned into the same cluster or group. Based on the specific word pattern, a word pattern of conversation text can be classified using k-means clustering into one of k clusters or classes. The mean inter- and intra-class distances of word patterns in text are determined, and word patterns (as distinct objects) are moved iteratively from one cluster to another such that each move improves the value of a pre-selected criterion function. Each cluster can comprise word patterns corresponding to specific shifts in a current conversation.

A word pattern, identified by pattern recognizer 404, can correspond to one or more identical or similar word patterns of one or more prior conversations archived in database 418. Statistical analyzer 406 can determine based on statistical analysis of the prior conversations the expected time devoted to an introduction, a topic, a question-and-answer phase, or a closing of a conversation, for example. Accordingly, based on the identification of a word pattern identified by pattern recognizer 404 and a corresponding time determined by statistical analyzer 406, ebb and flow determiner 408 can determine an anticipated ebb point. The anticipated ebb point corresponds to the likely time for concluding a current conversation.

As described above, topic identifier 402 determines at the start of a current conversation a topic or topics of the conversation and, based on the statistical analysis by statistical analyzer 406 of prior conversation pertaining to the same or similar topics, a likely time for concluding the current conversation. An anticipated ebb point is determined statistically based on the prior conversations and predicts the ebb point, that is the time at which the conversation begins to ebb or close. It is typically the point at which one or more closing comments are made concluding or "wrapping up" the conversation. The ebb point thus can be identified by a particular word pattern (e.g., phrase or sentence). As a conversation proceeds, word patterns indicating shifts or changes in the current conversation can be identified by pattern recognizer 404, prompting ebb and flow determiner 408 to revise the anticipated ebb point. A newly introduced topic identified by topic identifier 402 can also prompt ebb and flow determiner 408 to revise the anticipated ebb point. Depending on the change in the anticipated ebb point, the likely time for concluding the conversation is either set back or advanced accordingly.

In one embodiment, system 400 operations can be "push triggered" by a user's receipt of a message via a messaging system (e.g., enterprise-wide instant messaging, collaboration system messaging, email). Based on data contained in the message inviting the user to participate in a conversation, for example, system 400 can identify a topic or topics of the conversation, an initially determined anticipated ebb point, and the corresponding expected length of the conversation. The initial determinations can be made in advance of the start of the conversation (e.g., 15 minutes before, 24 hours before) in response to the user's receipt of the message. In another embodiment, system 400 operations can be "pull triggered" from a user's scheduling system (e.g., a calendaring system). With system 400 communicatively coupled to the scheduling system, system 400 can analyze scheduled events to determine whether any scheduled events relate to a conversation over a communication network to which system 400 also can be communicatively coupled. System 400 can identify a topic or topics of the conversation, an initially determined anticipated ebb point, and the corresponding expected length of the conversation based on data provided through the user's scheduling system.

Relatedly, system 400 operations can be "conditionally triggered" based on the user's scheduling multiple conversations within a predetermined time period or scheduling a set of back-to-back or overlapping conversations. System 400 operations also can be initiated in response to one or more scheduled actions, and thus optionally, system 400 can perform a scan or check to determine whether a user's electronic calendar shows a planned conversation. In light of individuals' inherent tendency to schedule conversations to begin at the top of the hour or the bottom of the hour, system 400 can periodically scan or check the user's scheduling for conversations beginning at such times (the top or bottom of the hour can mark the start for timing the length of a conversation). In still another embodiment, system 400 can be initiated in response to a specific user action such as joining a networked conversation. The Regardless of the mechanism of initiation, once the conversation starts, system 400 continues to monitor the conversation as described above, revising the anticipated ebb point (either advancing or delaying the anticipated ebb point) in response to the ebb and flow of the conversation that change the conversation in a way likely to lengthen or shorten the course of the conversation.

Response action initiator 410 optionally responds to a change in the anticipated ebb point by initiating one or more response actions. Optionally, a system user can pre-select which responses actions are initiated by response action initiator 410 and/or at which points during a conversation response actions are initiated. For example, as noted above, one response action can be notifying participants of a change in the anticipated ebb point. A pre-selected response action can be to notify participants of the expected time, based on a currently anticipated ebb point, that the conversation will conclude. Based on a user's pre-selection of response actions, notifications can be given for specific times and with specific probabilities (e.g., 75% probability of concluding in 20 minutes, 50% probability of concluding in 15 minutes, and so on). Accordingly, a probabilistically determined indication of when the conversation is likely to conclude can be provided. As also noted above, another action initiated can be to suggest a participant action to speed up the conversation (e.g., suggestion to participants to limit discussion to only one topic and/or avoid questions and answers). A user can pre-select such suggestions and set a point in the conversation for system 400 to make the pre-selected suggestion. For example, the user can pre-select that the suggestion be made in response to the anticipated ebb point being set back by more than a user-specified time (e.g., in response to the initially anticipated ebb point being set back by more than 30 minutes).

Still another response action noted above is to move the current conversation to an alternate platform or forum. More specifically, response action initiator 410 can activate an alternate platform and switch all or select ones of the participants to the alternative platform in response to a conversation change or shift (e.g., moving the anticipated ebb point back by more than a predetermined amount of time). For example, response action initiator 410 can respond (based on a user's pre-selection) to the anticipated ebb point being moved back by more than 20 minutes by activating a collaboration platform. Certain ones of the group of participants engaged in a current conversation over a telephone network can move, for example, to the collaboration platform to continue the conversation while other participants wrap up the conversation over the telephone network. Optionally system 400 can provide the participants that switch to the alternate platform a transcript of the conversation up to the point at which the participants switch platforms.

Certain of the operative features of system 400 are illustrated by a hypothetical scenario in which a host invites participants Alice, Bob, and Charlie to engage in a verbal conversation over a telephone system. System 400 initially determines an anticipated ebb point at 45 minutes, at which point closing remarks will be made and the conversation concluded. Alice and Bob join the conversation on time, but Charlie arrives late. Detecting the late arrival, system 400 recalculates the anticipated ebb point, shifting the anticipated ebb point to 48 minutes. System 400 monitors the ebb and flow of the conversation as the host updates the participants for 35 minutes on the state of a particular project. The anticipated ebb point remains constant. The host then asks Alice, Bob, and Charlie whether there are any questions. System 400 detects the shift to a question-and-answer phase, but based on a statistical analysis of past conversations, does not anticipate the conversation going on longer than presently anticipated. The anticipated ebb point remains at 48 minutes. Alice, however, asks a long and complicated question. System 400, based on recognizing certain word patterns in Alice's exchange with the host, recalculates the anticipated ebb point. The anticipated ebb point now extends beyond 55 minutes. Bob then asks a question, further shifting the anticipated ebb point to at least 58 minutes with a not insignificant probability of shifting back to 60-plus minutes. The participants are notified that the anticipated ebb point has shifted. Given the likely time now needed to conclude the conversation and still address Bob's question, Alice and Charlie indicate a desire to conclude without hearing the host address Bob's question. In response, system 400 initiates a response action to enable the conversation between the host and Bob to continue the conversation on a collaboration platform. Alice and Charlies are free to continue on the original platform and wrap up more quickly, while the host and Bob switch to the collaboration platform to continue a longer discussion. System 400 can generate a transcript of the conversation up to the point that the host and Bob switch to the collaboration platform, and the transcript can be conveyed on the collaboration platform to the host and Bob once the pair switch over to the collaboration platform.

Figure 6:
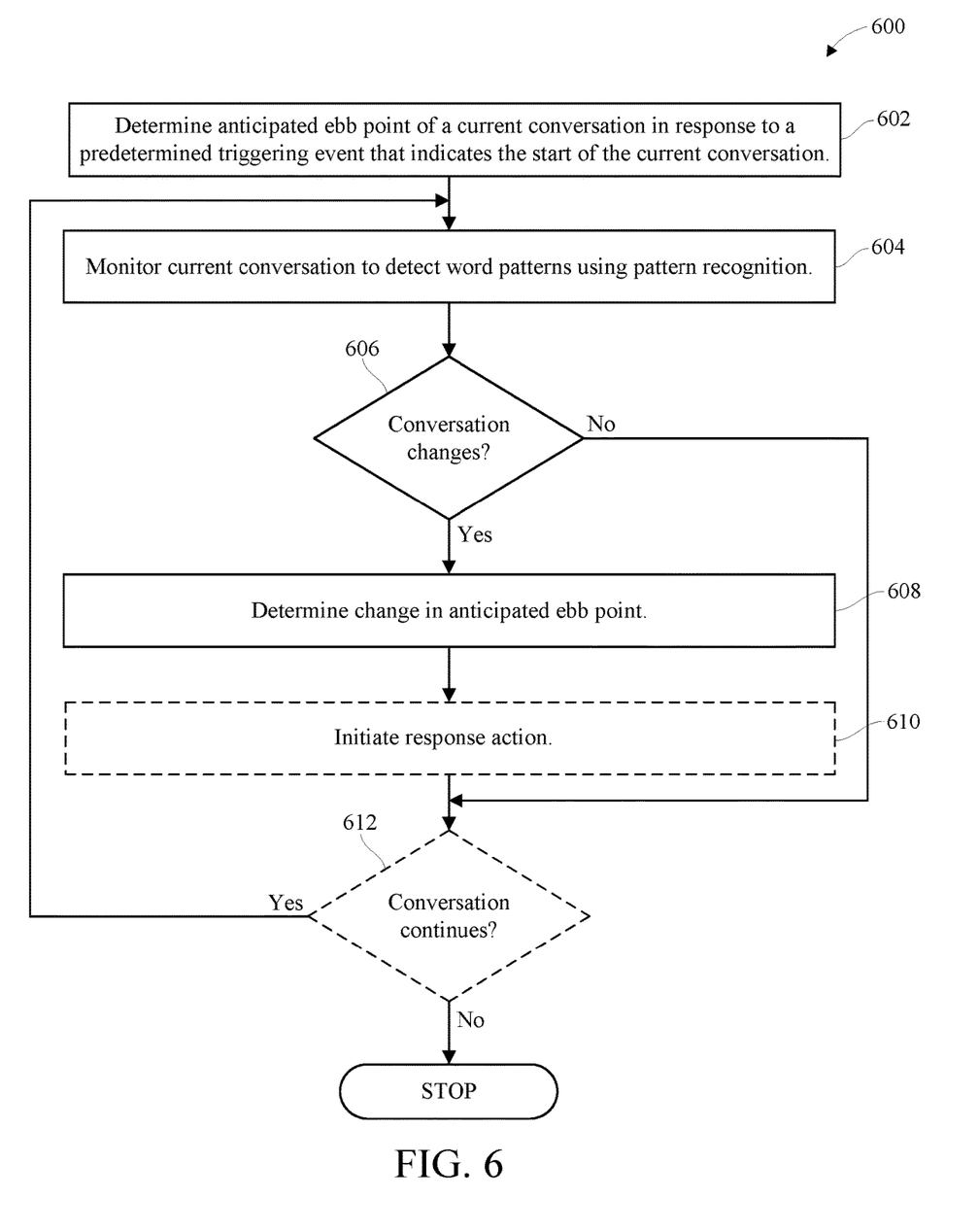
FIG. 6 is a flowchart of a method for structured conversation enhancement according to an embodiment of the present invention.

FIG. 6 is a flowchart of method 600 of structured conversation enhancement, according to one embodiment. Method 600 can be performed by a system the same as or similar to the systems described in reference to FIGS. 1-5. The system at block 602 determines an anticipated ebb point of a current conversation. The anticipated ebb point can be determined in response to a predetermined triggering event that indicates the start of the current conversation. At block 604 the system monitors the current conversation. Using pattern recognition, the system can monitor the current conversation to determine a probable change in the anticipated ebb point. If a word pattern corresponding to a change in the conversation is recognized at decision block 606, the system determines the change in the anticipated ebb point at block 608 in response to recognizing the word pattern indicating the change in the current conversation. Optionally, the system can respond to the change in the anticipated ebb point by initiating a response action at block 610. The system can optionally determine at decision block 612 whether the current conversation has ended or is continuing. The system optionally can return to block 604 to continue monitoring the ebb and flow of the current conversation in response to determining that the current conversation is continuing.

The anticipated ebb point of the current conversation can be based on a plurality of prior conversations grouped according to one or more identified topics of the current conversation. In one embodiment, the topic or topics can be identified with a deep learning neural network that learns to classify conversation text (including textual renderings of verbal conversations) into one of N categories, each of which correspond to a predetermined topic. The deep learning neural network can be trained using an archived collection of prior conversations.

The ebb and flow of the current conversation can be monitored using pattern recognition techniques for recognizing word patterns that correspond to changes in the current conversation. Changes in the current conversation can comprise the current conversation moving from an introduction to a topic-specific discussion, moving from one topic to another topic, beginning a question-and-answer phase, or moving the conversation from a question-and-answer phase or topic-specific discussion to a concluding phase.

One response action, initiated in response to determining a change in the anticipated ebb point, is notifying one or more of the participants in the current conversation of the change in the anticipated ebb point. In one embodiment, the notifying of the one or more participants includes indicating a probability that the current conversation will conclude within a specified time. Another response action is to establish an alternate platform for some participants to continue a conversation, leaving other participants free to wrap up a conversation on the platform on which the conversation began.

The various operations of the system are initiated in response to the triggering event. In one embodiment, the event is a push triggered event. In another embodiment, the event is a pull triggered event. In still another embodiment, the event is a conditionally triggered event, and in yet another embodiment the event is a user-initiated action.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction or intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrases "if it is determined" and "if [a stated condition or event] is detected" are to be construed to mean "in response to determining" or "responsive to determining" and "in response to detecting [the stated condition or event]" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the phrases "responsive to" and "in response to" mean responding or reacting readily to an action or event. Thus, if a second action is performed "responsive to" or "in response to" a first action, there is a causal relationship between an occurrence of the first action and an occurrence of the second action. The phrases "responsive to" and "in response to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "host," participant," and "user" mean a human being and "participants" means multiple human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, with computer hardware, an anticipated ebb point of a current conversation taking place on a first platform, the first platform being a first type of communication platform, in response to a predetermined triggering event indicating a start of the current conversation;
    monitoring, with the computer hardware, the current conversation using pattern recognition and determining a probable change in the anticipated ebb point in response to recognizing a word pattern indicating a change in the current conversation; and
    responsive to the probable change in the anticipated ebb point, initiating with the computer hardware, a response action, wherein the response action comprises activating a second platform, the second platform being a second type of communication platform different than the first type of communication platform, for the current conversation and switching a plurality of participants in the current conversation to the second platform.

2. The method of claim 1, wherein the anticipated ebb point of the current conversation is based on a plurality of prior conversations grouped according to an identified topic of the current conversation.

3. The method of claim 1, wherein the recognizing the word pattern indicating a change in the current conversation uses a deep learning neural network or k-means clustering.

4. The method of claim 3, wherein the change in the current conversation comprises moving from one phase of the current conversation to another or moving from one topic to another.

5. The method of claim 1, wherein the response action further comprises notifying a current conversation participant of the change in the anticipated ebb point.

6. The method of claim 5, wherein the notifying includes indicating a probability that the current conversation will conclude within a specified time.

7. The method of claim 1, wherein the predetermined triggering event is a push triggered event, pull triggered event, conditionally triggered event, scheduled action or user-initiated action.

8. A system, comprising:
a processor configured to initiate operations including:
  determining an anticipated ebb point of a current conversation taking place on a first platform, the first platform being a first type of communication platform, in response to a predetermined triggering event indicating a start of the current conversation;
  monitoring the current conversation using pattern recognition and determining a probable change in the anticipated ebb point in response to recognizing a word pattern indicating a change in the current conversation; and
  responsive to the probable change in the anticipated ebb point, initiating a response action, wherein the response action comprises activating a second platform, the second platform being a second type of communication platform different than the first type of communication platform, for the current conversation and switching a plurality of participants in the current conversation to the second platform.

9. The system of claim 8, wherein the anticipated ebb point of the current conversation is based on a plurality of prior conversations grouped according to an identified topic of the current conversation.

10. The system of claim 8, wherein the recognizing the word pattern indicating a change in the current conversation uses a deep learning neural network or k-means clustering.

11. The system of claim 8, wherein the change in the current conversation comprises moving from one phase of the current conversation to another or moving from one topic to another.

12. The system of claim 8, wherein the response action further comprises notifying a current conversation participant of the change in the anticipated ebb point.

13. The system of claim 12, wherein the notifying includes indicating a probability that the current conversation will conclude within a specified time.

14. A computer program product comprising a computer readable storage medium having program instructions embodied therewith, wherein the computer readable storage medium is not a transitory, propagating signal per se, the program instructions executable by a processor to cause the processor to initiate operations comprising:
  determining, by the processor, an anticipated ebb point of a current conversation taking place on a first platform, the first platform being a first type of communication platform, in response to a predetermined triggering event indicating a start of the current conversation;
  monitoring, by the processor, the current conversation using pattern recognition and determining a probable change in the anticipated ebb point in response to recognizing a word pattern indicating a change in the current conversation; and
  responsive to the probable change in the anticipated ebb point, initiating by the processor, a response action, wherein the response action comprises activating a second platform, the second platform being a second type of communication platform different than the first type of communication platform, for the current conversation and switching a plurality of participants in the current conversation to the second platform.

15. The computer program product of claim 14, wherein the anticipated ebb point of the current conversation is based on a plurality of prior conversations grouped according to an identified topic of the current conversation.

16. The computer program product of claim 14, wherein the recognizing the word pattern indicating a change in the current conversation uses a deep learning neural network or k-means clustering.

17. The computer program product of claim 14, wherein the change in the current conversation comprises moving from one phase of the current conversation to another or moving from one topic to another.

18. The computer program product of claim 14, wherein the response action further comprises notifying a current conversation participant of the change in the anticipated ebb point.

19. The computer program product of claim 18, wherein the notifying includes indicating a probability that the current conversation will conclude within a specified time.

20. The computer program product of claim 14, wherein the predetermined triggering event is a push triggered event, pull triggered event, conditionally triggered event, or user-initiated action.

* * * * *